United States Patent
Konno et al.

(10) Patent No.: US 7,479,046 B2
(45) Date of Patent: Jan. 20, 2009

(54) FUEL CELL AND FUEL CELL CONNECTER (75) Inventors: Norishige Konno, Toyota (JP); Ryuichi Komiyama, Machida (JP)

(73) Assignees: Toyota Jidosha Kabushiki Kaisha, Toyota-shi (JP); Tyco Electronics AMP K.K., Kawasaki-shi (JP)

( * ) Notice: Subject to any disclaimer, the term of this patent is extended or adjusted under 35 U.S.C. 154(b) by 0 days.

(21) Appl. No.: 11/657,577

(22) Filed: Jan. 25, 2007

(65) Prior Publication Data

US 2007/0190842 A1 Aug. 16, 2007

(30) Foreign Application Priority Data

Jan. 25, 2006 (JP) ............................. 2006-015799

(51) Int. Cl.
*H01R 9/22* (2006.01)
(52) U.S. Cl. ..................................... 439/717
(58) Field of Classification Search .................. 439/717
See application file for complete search history.

(56) References Cited

U.S. PATENT DOCUMENTS 6,844,093 B2 1/2005 Kikuchi et al.
2003/0040226 A1* 2/2003 Lee ............................ 439/717

FOREIGN PATENT DOCUMENTS

| JP | 2002-313399 | 10/2002 |
| JP | 2003-109649 | 4/2003 |
| JP | 2004-127776 | 4/2004 |
| JP | 2006-216486 | 8/2006 |

* cited by examiner

*Primary Examiner*—Gary F. Paumen
(74) *Attorney, Agent, or Firm*—Kenyon & Kenyon LLP (57) ABSTRACT A connecter comprises a housing having a first lateral surface having a convex fitting portion and a second lateral surface opposed to the first lateral surface and having a convex fitting portion, and a plurality of detection terminals accommodated in the housing, each capable of connection to the electrode provided to the single cell stacking body, wherein the fitting portion formed on the first lateral surface is positioned corresponding to a recess between the fitting portions formed on the second lateral surface, and the fitting portion formed on the second lateral surface is positioned corresponding to a recess between the fitting portions formed on the first lateral surface.

7 Claims, 11 Drawing Sheets

Related Art

Related Art

Fig. 11

FUEL CELL AND FUEL CELL CONNECTER

CROSS-REFERENCE TO RELATED APPLICATION

This application claims priority to Japanese Patent Application No. 2006-015799, filed on Jan. 25, 2006.

BACKGROUND OF THE INVENTION

1. Field of the Invention

The present invention relates to a fuel cell and a fuel cell connecter.

2. Description of the Related Art

A fuel cell mounted in an electric or hybrid vehicle or the like is formed by stacking a large number of electric power generation units, each referred to as a cell (a single cell), into numerous layers. Each of the single cells comprises an electrolyte membrane made of an ion exchange membrane which is sandwiched by an anode and a cathode on the respective sides and further by a pair of separator on both outer sides thereof. A path is defined on the separator for supplying fuel gas, such as hydrogen gas, and oxidant gas, such as oxygen gas, to the anode and the cathode, respectively. Fuel and oxidant gases supplied through the path cause chemical reaction inside the cell, which generates power.

Figure 9:
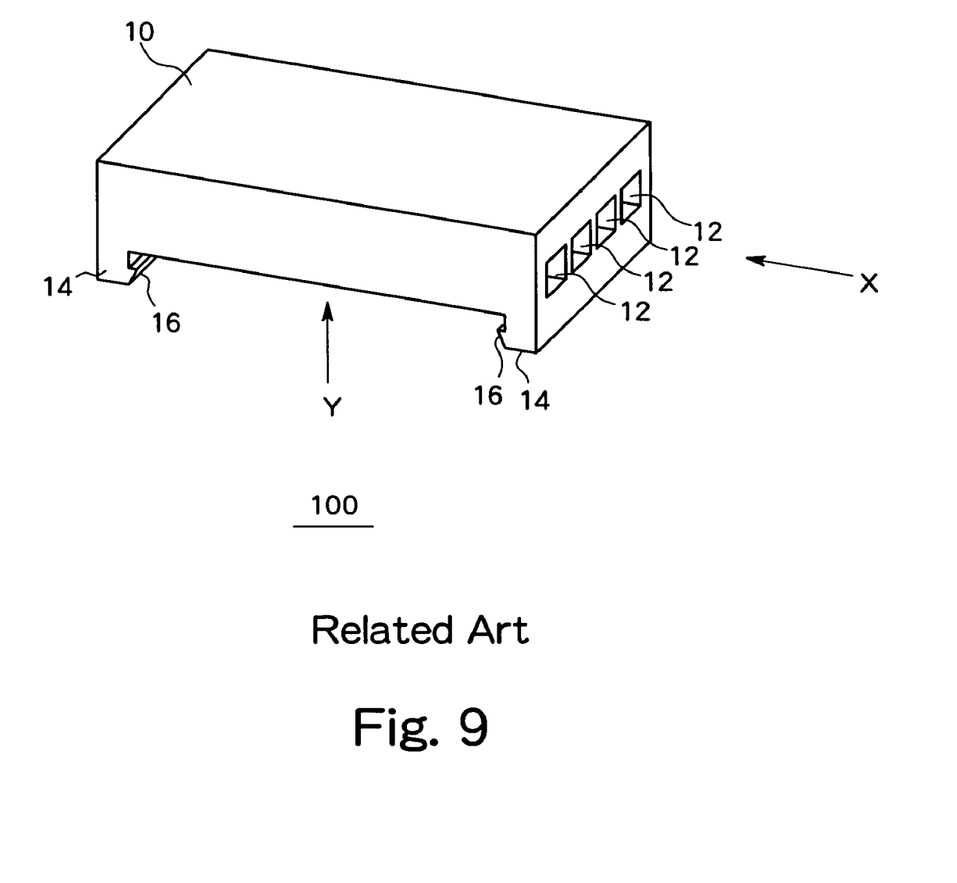
FIG. 9 is a perspective view showing an external appearance of a connecter according to background art.

For such a fuel cell, management of the power generation state for each single cell is necessary in order to control the amounts of supplied fuel and oxidant gases and to find a faulty cell. To enable such management, the generation voltage for each single cell is monitored so that the control is carried out based on the monitored generation voltage. Generally, a connecter 100 comprising a housing 10, as shown in FIG. 9, inside which detection terminals (not shown) are arranged at intervals equal to those of the separators of the plurality of single cells, is used. FIG. 9 is a perspective view of such a connecter 100, viewed from diagonally above the rear surface X. Openings 12 are defined on the rear surface X of the housing 10 in conformity with the arrangement of the detection terminals. Penetration slits (not shown) are formed on the bottom surface Y of the housing 10 with a pitch corresponding to the arrangement of the detection terminals. The penetration slits are available for connecting the electrode of each single cell and each detection terminal when mounting the connecter 100 in the fuel cell 102 described below.

Figure 10:
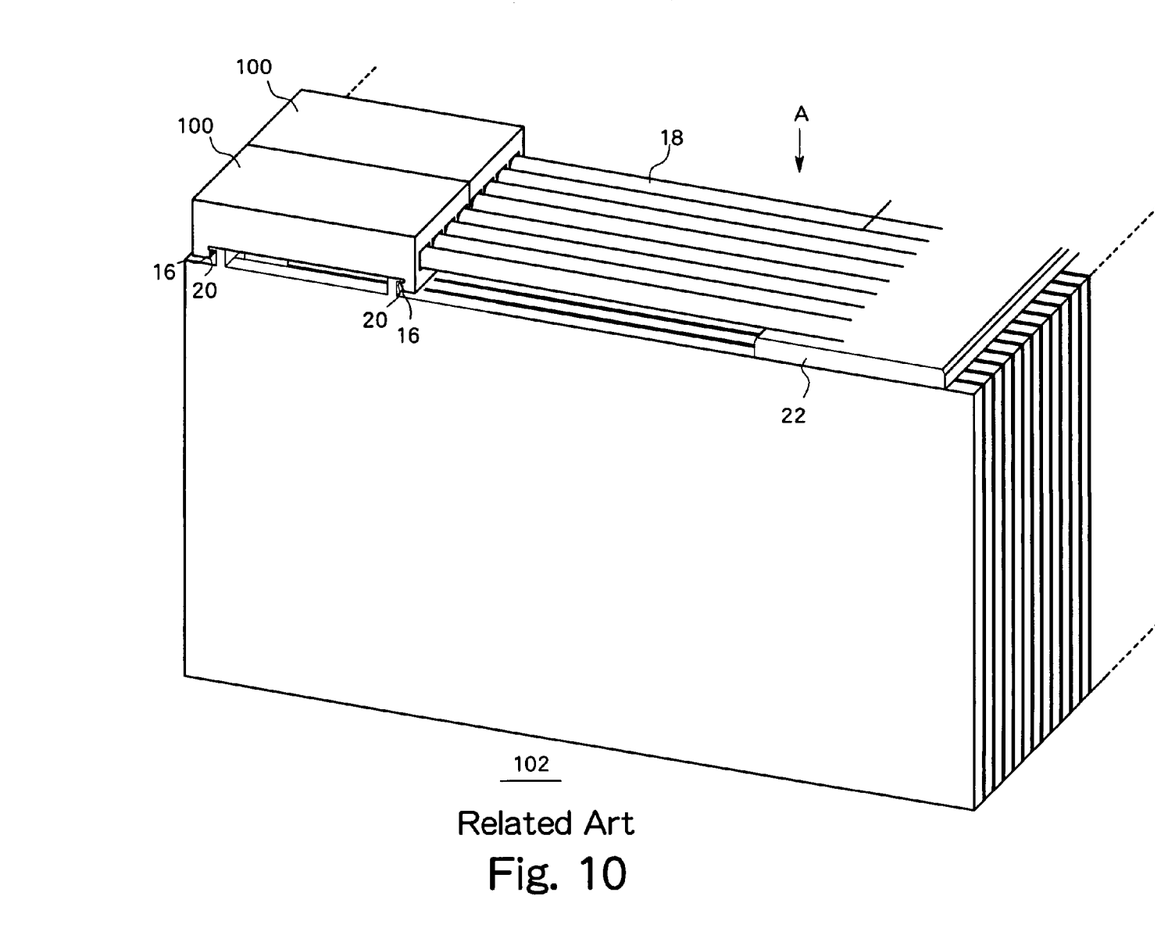
FIG. 10 is a perspective view of a fuel cell with a connecter according to background art mounted therein.

The housing 10 has legs 14 formed thereon. Each leg 14 has a hook-like projecting engagement portion 16 formed thereon. The connecter 100 is mounted in the fuel cell 102, as shown in FIG. 10. The fuel cell 102 has a resin hook portion 20 formed thereon. With the hook portion 20 engaged with the engagement portion 16 of the connecter 100, the connecter 100 is fixed to the fuel cell 102. The fuel cell 102 also has a tension plate 22 formed on the top surface A thereof, which extends in the direction in which the single cells are stacked. Electrical wires 18 connected to each of the detection terminals of the connecter 100 are securely fixed on the tension plate 22.

Here, the electrode of the fuel cell to which the detection terminal in the connecter is to be connected is made of carbon. When a carbon electrode is employed, each single cell must be formed relatively thicker in consideration of the need to provide sufficient structural strength or the like. However, there is an increasing demand for thinner single cells in conjunction with the recent improvement in efficiency of power generation by a singe cell used in a fuel cell, and power generation by a thinner single cell becoming possible.

Figure 11:
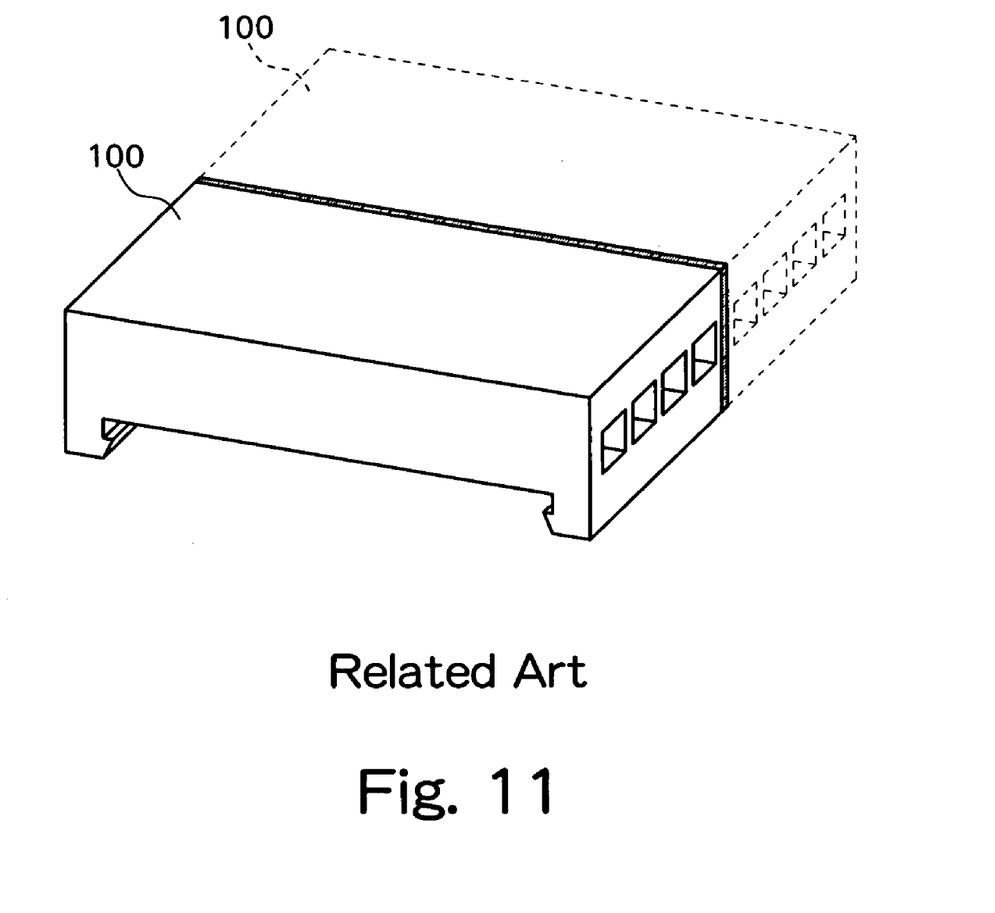
FIG. 11 is a diagram explaining a problem suffered by the connecter according to. background art.

When single cells having a thinner width as described above are employed and the connecters 100 are mounted side by side, regions where the housings 10 of the adjacent connecters 100 spatially interfere with each other (the hatched portion in FIG. 11) are formed, as shown in FIG. 11. This leads to a program that the connecter 100 cannot be properly mounted.

Meanwhile, when the outer wall of the housing 10 is formed thinner to avoid such interference, insufficient structural strength is provided for the connecter, which leads to problems of decreased manufacturing efficiency of the connecters and more frequent breakage of the connecters during mounting or installation.

SUMMARY OF THE INVENTION

The present invention relates to a connecter for connecting an electrical wire to each of electrodes of all single cells contained in a single cell stacking body formed by stacking a plurality of single cells.

According to one aspect of the present invention, there is provided a connecter comprises a housing having a first lateral surface having a convex fitting portion and a second lateral surface opposed to the first lateral surface and having a convex fitting portion, and a plurality of detection terminals accommodated in the housing, each capable of connection to the electrode provided to the single cell stacking body, wherein the fitting portion formed on the first lateral surface is positioned corresponding to a recess between the fitting portions formed on the second lateral surface, and the fitting portion formed on the second lateral surface is positioned corresponding to a recess between the fitting portions formed on the first lateral surface.

BRIEF DESCRIPTION OF THE DRAWINGS

Embodiment of the present invention will be described in detail with reference to the following figures, wherein.

DESCRIPTION OF THE PREFERRED EMBODIMENT

Figure 1:
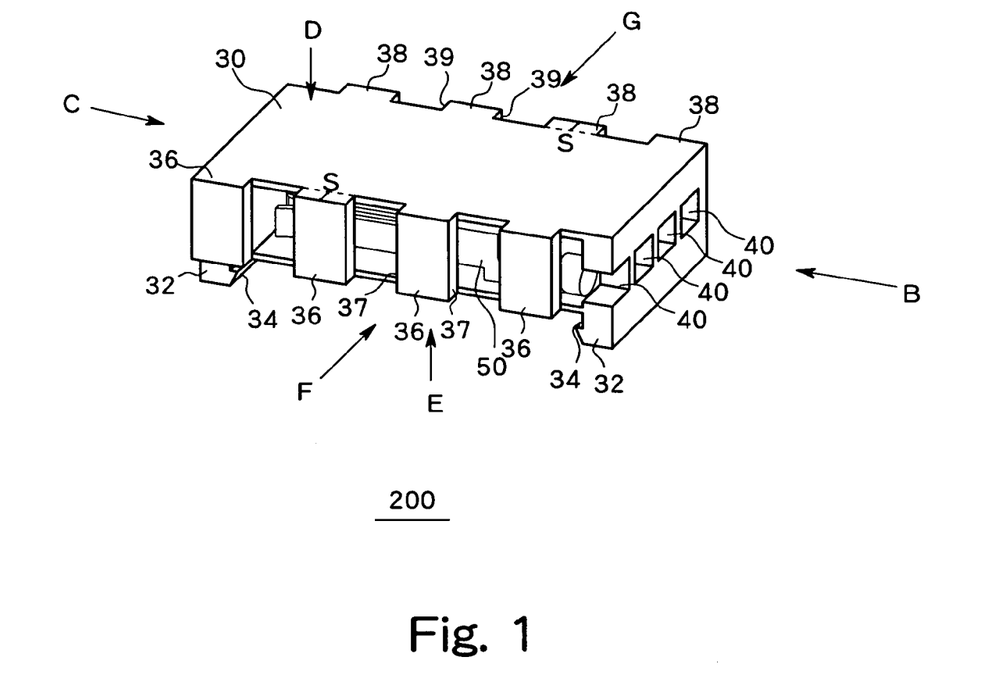
FIG. 1 is a perspective view showing an external appearance of a housing in an embodiment of the present invention.
Figure 2:
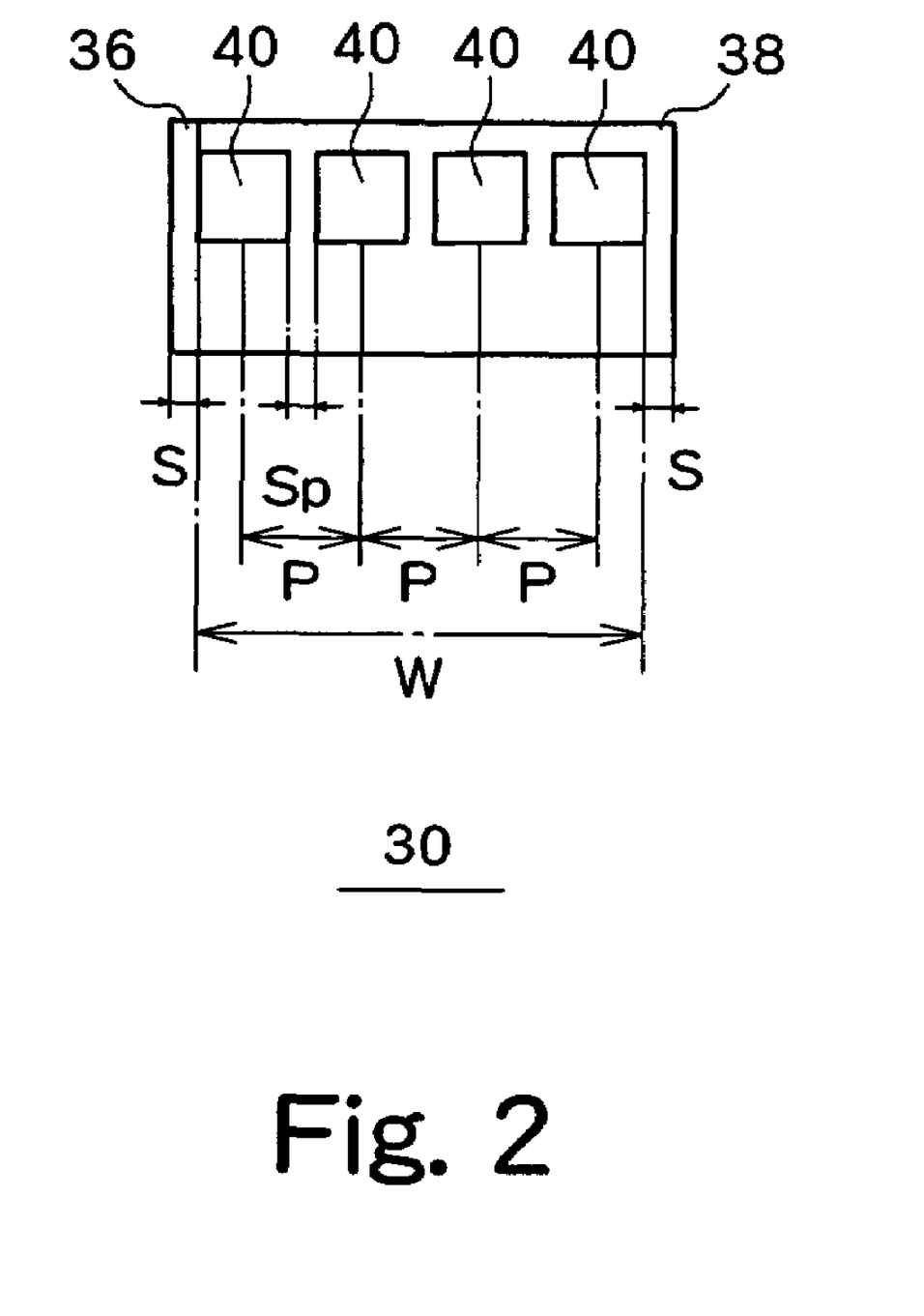
FIG. 2 is a rear side view of the housing in the embodiment of the present invention.
Figure 3:
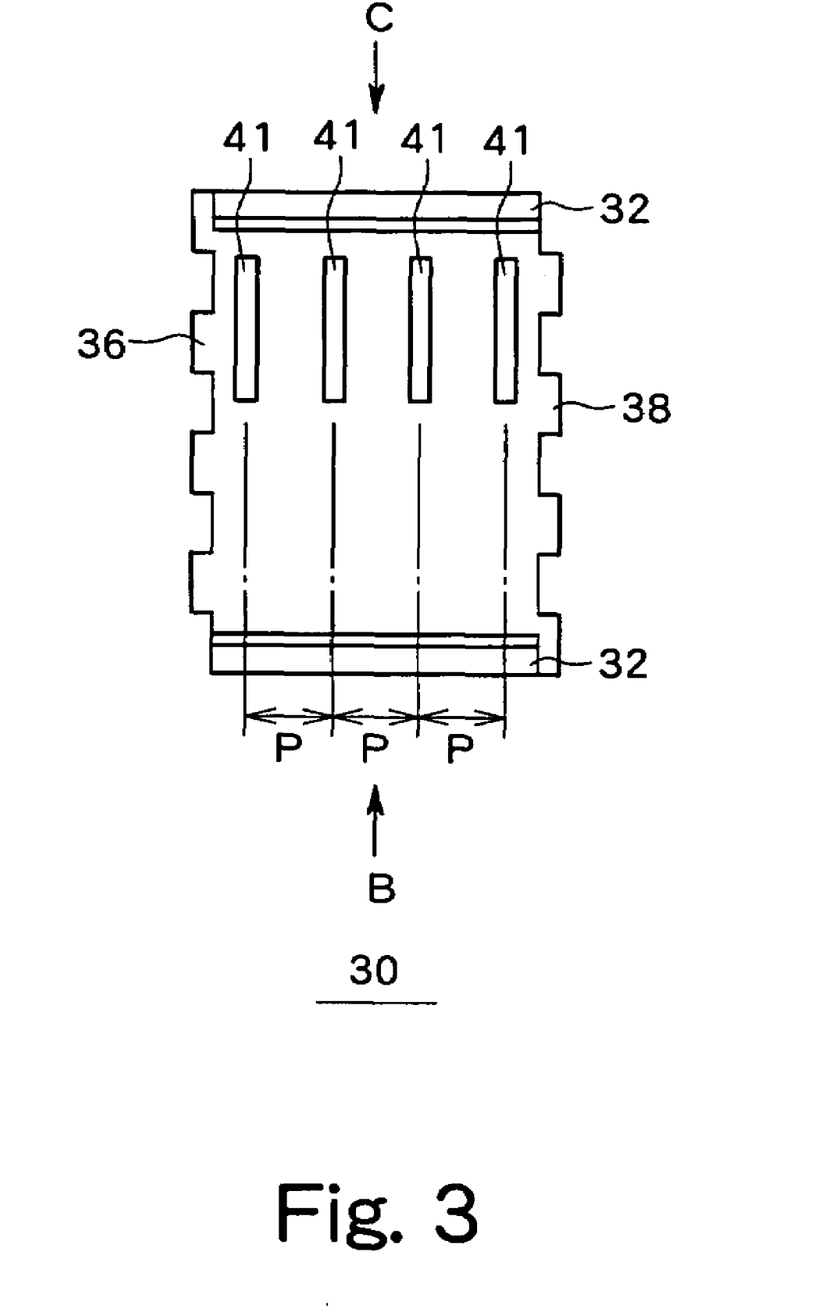
FIG. 3 is a bottom view of the housing in the embodiment of the present invention.
Figure 4:
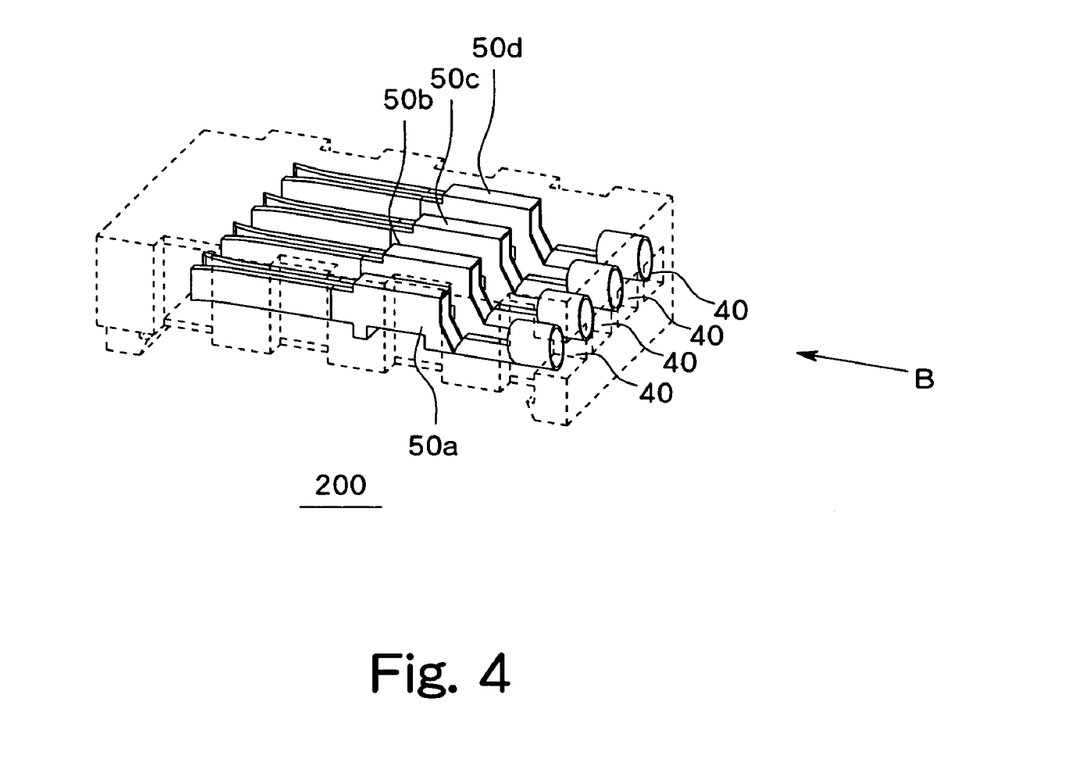
FIG. 4 is a perspective view showing inside of the connecter in the embodiment of the present invention.

A connecter 200 of a fuel cell according to an embodiment of the present invention is constructed comprising a resin housing 30, as shown in FIGS. 1 to 3. FIG. 1 is a perspective view of the housing 30 of the connecter 200 viewed from diagonally above the rear surface B thereof. FIG. 2 is a rear side view of the housing 30 of the connecter 200 viewed from the rear surface B side. FIG. 3 is bottom view of the housing 30 of the connecter 200 viewed from the bottom surface E side. FIG. 4 is a perspective view corresponding to FIG. 1, showing the arrangement of the detection terminals 50 inside the housing 30.

Inside the housing 30, four detection terminals 50a to 50d are arranged side by side from the lateral surface F to the lateral surface G, as shown in FIG. 4. The detection terminals 50a to 50e are arranged at intervals equal to those of the stacking pitch P of the single cells of the fuel cell 300 to be described later. Openings 40 are defined on the rear surface B of the housing 30 in conformity with the arrangement of the detection terminals 50a to 50d, so that the electrical wires connected to the detection terminals 50a to 50d are pulled out via the respective openings 40. The interval between the adjacent openings 40 is equal to the stacking pitch P of the single cells of the fuel cell 300.

On the bottom surface E of the housing 30, projecting legs 32 are formed through the entire width of the bottom surface E between the lateral surface F and the lateral surface G. The legs 32 are formed along both side edges B and C. Each leg 32 has a hook-like projecting engagement portion 34 formed thereon over the entire width of the housing 30 such that the engagement portions 34 on the opposed legs 32 oppose each other. It should be noted that the structures of the legs 32 and the engagement portions 34 are not limited to the above example, and any structure for reliably fixing the connecter 200 to the fuel cell 300 described below may be employed.

The housing 300 has penetration slits 41 formed on the bottom surface E thereof with a pitch P according to the arrangement of the detection terminals 50a to 50d, as shown in FIG. 3. The penetration slits 41 are formed where the contact portions 54a, 54b of each of the detection terminals 50a to 50d to be described later are located. The penetration slit 41 is available for connecting the electrode of each single cell to each of the detection terminals 50a to 50d when mounting the connecter 200 in the fuel cell 300 to be described later. That is, the penetration slit 41 has such a shape that allows the electrode of the fuel cell 300 to insert between the contact portions 54a and 54b.

As shown in FIG. 1, the housing 30 has a first lateral surface F where a convex fitting portion 36 is formed and a second lateral surface G where a convex fitting portion 38 is formed. The fitting portions 36, 38 are shaped such that the fitting portions 36 and 38 of two adjacent housings 30 are engaged with each other. That is, the convex fitting portion 36 on the first lateral surface F is positioned corresponding to the concave between the adjacent fitting portions 38 on the second lateral surface G; the convex fitting portion 38 on the first lateral surface G is positioned corresponding to the concave between the adjacent fitting portions 36 on the second lateral surface F.

In this embodiment, the fitting portions 36, 38 are formed convex through the entire height of the respective surfaces F and G between the top surface D and the bottom surface E so as to appear rectangle when viewed from the first and second lateral surfaces F and G sides, respectively. Preferably, the fitting portions 36, 38 have lateral surfaces 37, 39 which are perpendicular, when viewed from the first or second lateral surface F and G sides, respectively, to the upper and bottom surfaces D and E of the housing.30.

The width of the housing 30 which includes the fitting portions 36, 38 is preferably equal to that of combination of the distance between the outermost openings 40, or the interval W, and the widths S of the fitting portions 36 and 38 (the width of the portion projecting from the lateral surface of the housing 30), as shown in FIG. 2. The width S of the fitting portion 36, 38 is preferably substantially equal to, and more preferably slightly shorter than, the interval Sp of the adjacent openings 40 defined on the housing 30.

It should be noted that the width S of the fitting portion 36, 38 may be determined in a manner other than that described above in consideration of the strength of the housing 30. That is, any width S may be applicable as long as the width S ensures, when the fitting portion 36 of one housing 300 is engaged with the fitting portion 38 of another housing 300, the distance between the adjacent openings 40 each on each of the two adjacent housings 30 is substantially equal to the interval Sp, and that the housing 30 has structural strength tolerable for use.

In other words, it is preferable that the widths S of the fitting portions 36, 38 are determined such that, when two connecters 200 are arranged side by side with the fitting portion 36 on the first lateral surface F of the first connecter 200 engaged with the fitting portion 38 on the second lateral surface G of the second connecter 200, the interval between the detection terminal 50a mounted inside the first connecter 200 closest to the first surface F thereof and the detection terminal 50d mounted inside the second connecter 200 closest to the second lateral surface G thereof is substantially equal to the pitch P.

Figure 5:
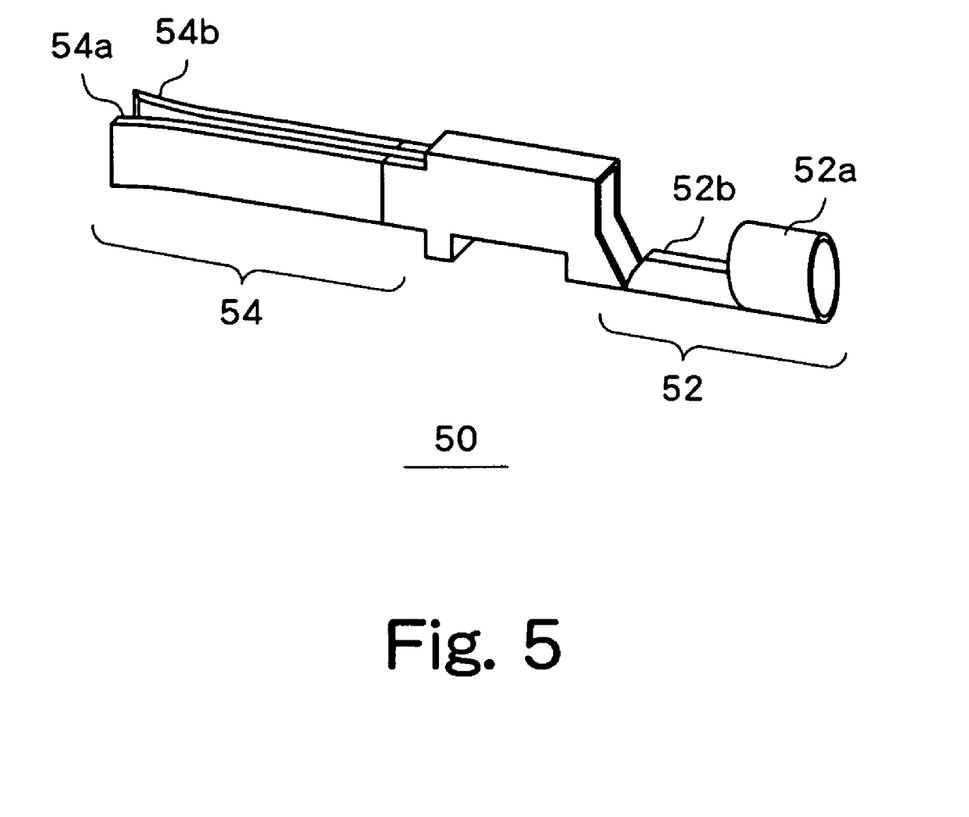
FIG. 5 is a perspective view showing an external appearance of a detection terminal in the embodiment of the present invention.

The detection terminal 50 is made from a highly conductive elastic material, such as metal, or the like, with copper alloy generally employed. The detection terminal 50 is constructed comprising an electrical wire crimp portion 52 for connecting an electrical wire, and an electrode contact portion 54 for connection to an electrode of the fuel cell 300 to be described later, as shown in FIG. 5. The electrical wire crimp portion 52 includes an insulation barrel 52a and a wire barrel 52b. The insulation barrel 52a receives and crimps an electrical wire with insulation; the wire barrel 52b receives and crimps a conductor with the insulating coating stripped away.

The electrode contact portion 54 includes two opposed strip (elastic) contact portions 54a and 54b having flat rectangular shape. Preferably, the interval between the contact portions 54a and 54b is defined slightly smaller than the width of the electrode of the single cell of the fuel cell 300 to be described later. This arrangement ensures reliable electrical connection between the detection terminal 50 and the electrode of the fuel cell 300. Further preferably, the tip ends of the contact portions 54a, 54b are curved outwardly, as shown in FIG. 5. This arrangement can facilitate insertion of the electrode of the fuel cell 300 into between the contact portions 54a and 54b.

It should be noted that the structure of the detection terminal 50 is not limited to the above example, and any structure which can be accommodated in the housing 30 and electrically connect an electrical wire to the electrode of fuel cell 300 may be employed. For example, a structure capable of connecting the conductor of an electrical wire by means of pressure may be employed instead of the electrical wire crimp portion 52. The detection terminals 50 to be mounted in the housing 30 may all have the same shape, such that no further preparation than preparation of a single kind of detection terminals 50 is required.

It should be noted that, although four detection terminals 50a to 50d are arranged in the housing 30 in this embodiment, this structure is not an exclusive example, and a greater or lesser number of detection terminals 50 may be arranged in the housing 30.

Figure 6:
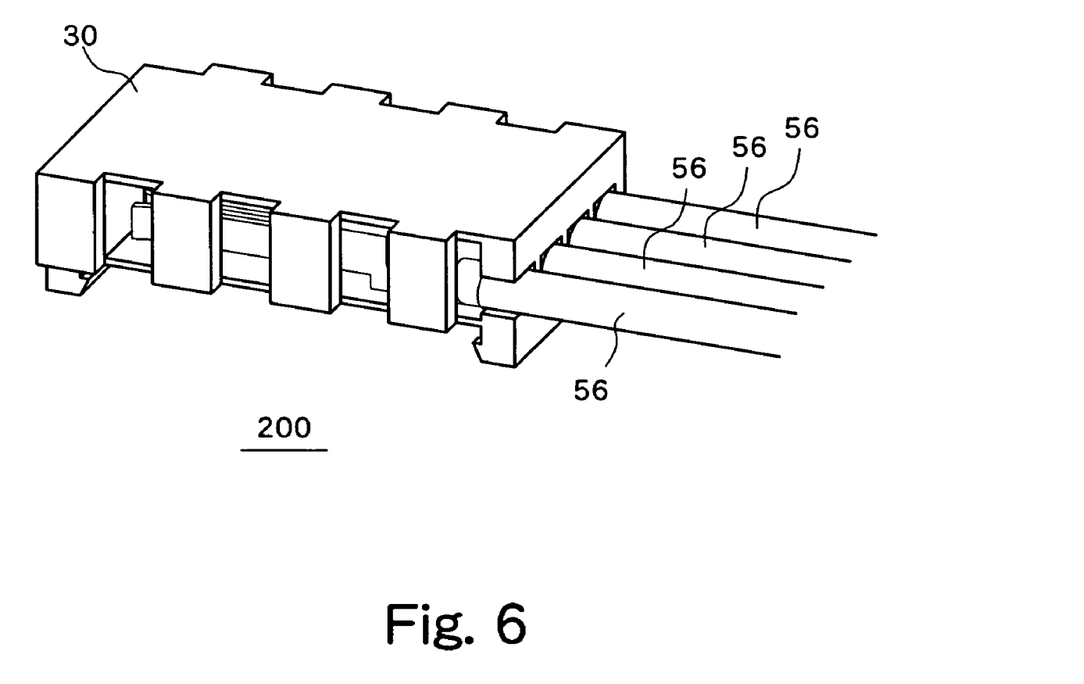
FIG. 6 is a perspective view showing an external appearance of the connecter with an electrical wire connected thereto in the embodiment of the present invention.

FIG. 6 is a perspective view of the connecter 200 with the detection terminals 50 mounted therein, viewed from above the rear surface thereof. Specifically, in FIG. 6, the electrical wires 56 are crimped to the detection terminals 50, and pulled out through the openings 40 defined on the rear surface B of the housing 30.

Figure 7:
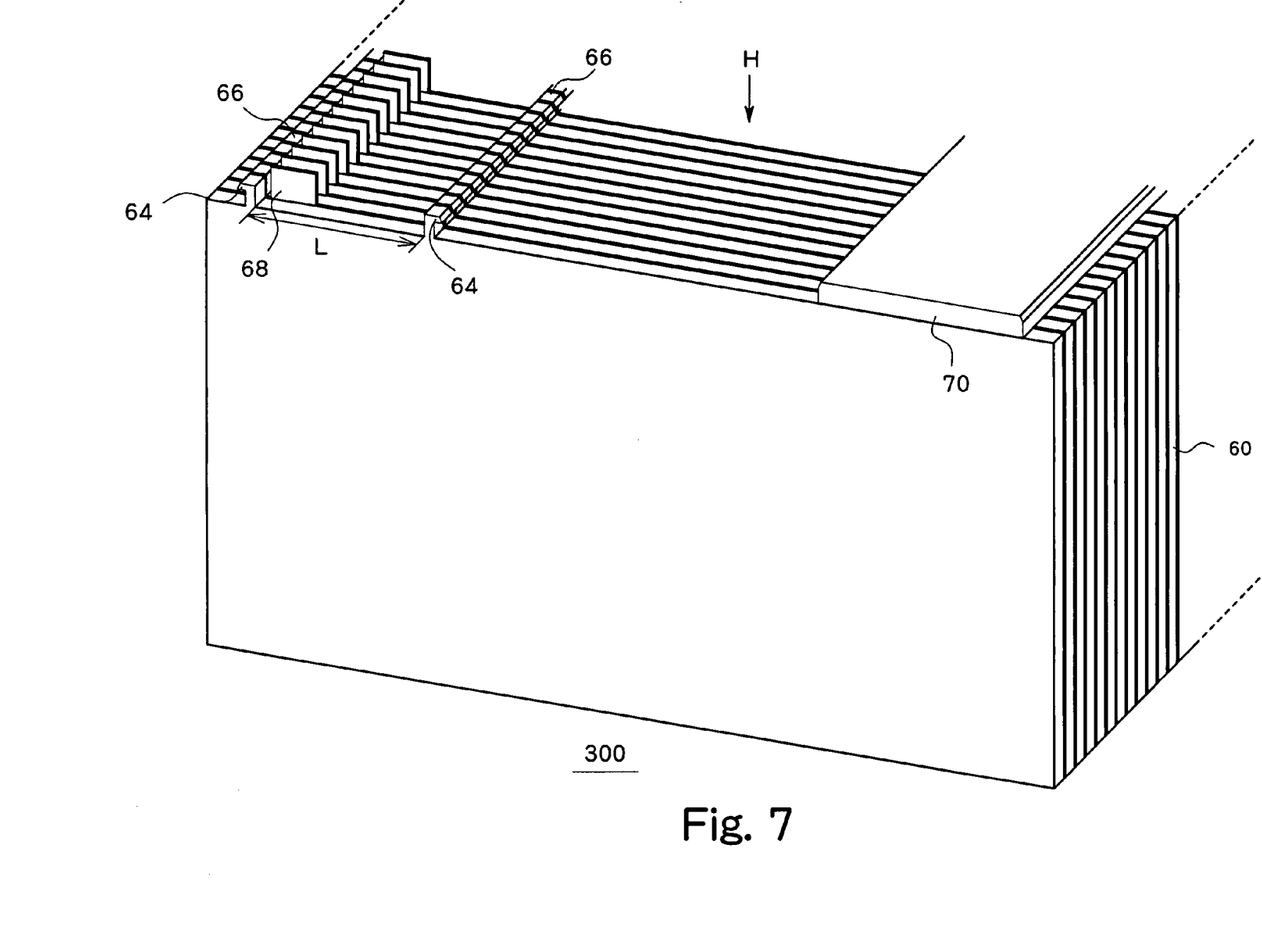
FIG. 7 is a perspective view showing an external appearance of a fuel cell in the embodiment of the present invention.
Figure 8:
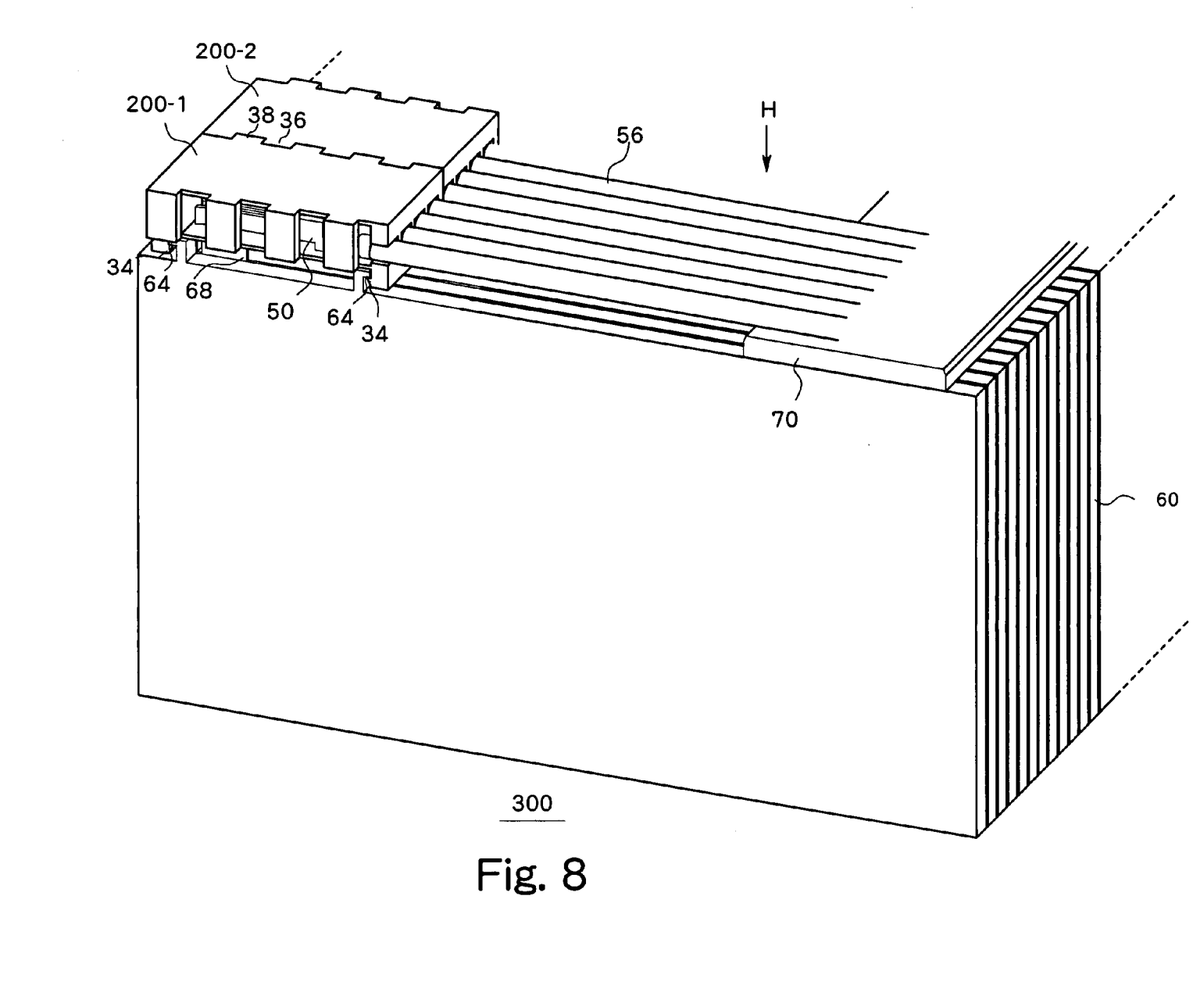
FIG. 8 is perspective view showing an external appearance of the fuel cell with the connecter mounted therein in the embodiment of the present invention.

FIG. 7 shows an external appearance of the fuel cell 300 in this embodiment. FIG. 8 shows an external appearance of the fuel cell 300 with the connecter 200 mounted therein.

The fuel cell 300 is formed by stacking a large number of single cells 60, each serving as a power generation unit. Each of the single cells 60 is formed by sandwiching an electrolyte membrane, or an ion exchange membrane, by an anode and a cathode on both sides thereof, respectively, and further by a pair of separators on the outer sides thereof. The single cells 60 are stacked with an interval of a pitch P between the adjacent single cells 60. A path is formed on the separator for supplying fuel gas such as hydrogen gas or the like and oxidant gas such as oxygen gas or the like to the anode and the cathode. The fuel and oxidant gases supplied via the path cause chemical reaction inside each single cell 60, whereby power is generated.

A projection 66 is formed on each of two places on the top surface H of the fuel cell 300. The projection 66 can be formed by forming the resin which constitutes the single cell 60 of the fuel cell 300 so as to project from the top surface H of the fuel cell 300. The distance L between the two projections 66 is slightly shorter than the distance between the inner walls of the two legs 32 formed on the connecter 200. The projection 66 has a hook portion 64 formed thereon for engagement with the engagement portion 34 of the connecter 200. Stacking the single cells 60 results in a structure in which the projected portions 60 are arrayed in the stacking direction of the single cells 60.

It should be noted that the structure of the hook portion 64 is not limited to that described above, and any structure which can reliably fix the connecter 200 to the fuel cell 300 by engaging with the engagement portion 34 formed on the connecter 200 may be employed.

A metal electrode 68 is formed, projecting upward from the separator of each single cell 60. The electrode 68 projects in a space between the projections 66 formed in the two places. The interval between the adjacent electrodes 68 is equal to the pitch P as the interval between the adjacent single cells 60 is defined as the pitch P. The projecting electrodes 68 are positioned in conformity with the positions of the penetration slots 41 defined on the bottom surface E of the housing 30 of the connecter 200. With this arrangement, the electrode 68 can be inserted into the gap between the contact portions 54a and 54b of the electrode contact portion 54 to thereby establish electrical connection, when mounting the connecter 200 in the fuel cell 300.

It should be noted that, when the projection 66 and the hook portion 64 are made of resin and the electrode 68 is made of metal, enhanced structural strength than that of a conventional single cell is achieved, which allows employment of a smaller pitch P than that in a conventional design, for the single cells 60.

The fuel cell 300 further has a tension plate 70 formed on the top surface H thereof, which extends in the direction in which the single cells 60 are stacked. Preferably, the tension plate 70 is made of insulating resin. The tension plate 70 is provided for fixture of the electrical wire 56 pulled out from the detection terminal 50 inside the connecter 200. Use of the tension plate 70 makes it possible to set in array the electrical wires 56 extending over the top surface H of the fuel cell 300.

As shown in FIG. 8, the connecter 200 is mounted in the fuel cell 300. Specifically, the connecter 200 is mounted such that the electrode 68 of the fuel cell 300 penetrates the penetration slit 41 defined on the bottom surface E of the connecter 200. Consequently, the electrode 68 of each single cell 60 is sandwiched by the contact portions 54a and 54b of each of the detection terminals 50a to 50d, and thereby electrically connected to each of the detection terminals 50a to 50d.

When mounting the connecter 200, the engagement portion 34 thereof is brought into engaged with the hook portion 64 of the fuel cell 300. With this arrangement, the connecter 200 can be reliably mounted in the fuel cell 300.

Further, when the connecter 200-2 is mounted next to the connecter 200-1, as shown in FIG. 8, the connecter 200-2 can be mounted such that the fitting portion 38 of the connecter 200-1 is engaged with the fitting portion 36 of the connecter 200-2. Here, when the fitting portions 36, 38 are formed in advance so as to have lateral surfaces 37, 39 perpendicular, when viewed from the first and second lateral surfaces F and G sides of the connecter 200, to the upper and bottom surfaces D and E of the housing 30, as shown in FIG. 1, it is possible for one of the connecters 200 to be mounted in the manner as described above while sliding the fitting portion thereof along the fitting portion of the other connecter 200.

In this embodiment, each of the widths S of the fitting portions 36, 38 is defined such that the interval between the detection terminal 50d mounted inside the first connecter 200-1 closest to the second lateral surface G thereof and the detection terminal 50a mounted inside the first second connecter 200-2 closest to the first lateral surface F thereof becomes substantially equal to the pitch P. More specifically, each of the widths S of the fitting portions 36, 38 (the length of the portion projecting from the lateral surfaces of the housing 30) is defined substantially equal to, or slightly smaller than, the interval Sp of the adjacent openings 40 defined on the housing 30. Further, the width of the housing 30 is defined equal to the length of the combination of the distance W between the outermost openings 40, that is, those on the opposite sides, defined on the housing 30 and the widths S of the fitting portions 36 and 38. This arrangement can avoid spatial interference between the connecters 200-1 and 200-2 mounted side by side. Further, a width corresponding to the width S of the fitting portion 36, 38 can be ensured for each of the lateral surfaces F and G of the housing 30, which ensures mechanical rigidity of the housing 30.

Further, in a structure in which the electrical wire 56 is pulled out in a direction perpendicular to the top surface H of the fuel cell 300, the electrical wire 56 must be bent into the direction along the top surface H of the fuel cell 300, which imposes a mechanical strain on the electrical wire 56, which could eventually lead to parting or breaking of the electrical wire 56.

However, in the connecter 200 in this embodiment, the electrical wire 56 is pulled out from the rear surface B of the connecter 200. This structure allows the electrical wire 56 to run along the top surface H of the fuel cell 30 without bending. As a result, breaking or damage of the electrical wire 56 can be prevented.

What is claimed is:

1. A connecter for connecting an electrical wire to each of electrodes of all single cells contained in a single cell stacking body formed by stacking a plurality of single cells, comprising:
- a housing having a first lateral surface having a convex fitting portion and a second lateral surface opposed to the first lateral surface and having a convex fitting portion and; and
- a plurality of detection terminals accommodated in the housing, each capable of connection to the electrode provided to the single cell stacking body, wherein
the fitting portion formed on the first lateral surface is positioned corresponding to a recess between the fitting portions formed on the second lateral surface, and
the fitting portion formed on the second lateral surface is positioned corresponding to a recess between the fitting portions formed on the first lateral surface.

2. The connecter according to claim 1, wherein the connecter has a shape which allows, when mounting a plurality of connecters in the single cell stacking body so as to be adjacent with each other, the fitting portions formed on adjacent surfaces of the adjacent connecters to be engaged with each other.

3. The connecter according to claim 2, wherein
the plurality of detection terminals are arranged at a predetermined interval, and
when a first connecter and a second connecter, both having identical shapes, are mounted adjacent to each other in the single cell stacking body such that the fitting portion formed on the first lateral surface of the first connecter is engaged with the fitting portion formed on the second lateral surface of the second connecter, an interval between a detection terminal mounted inside the first connecter, closest to the first lateral surface thereof and a detection terminal mounted inside the second connecter, closest to the second lateral surface thereof becomes substantially equal to the predetermined interval.

4. The connecter according to claim 1, wherein the plurality of detection terminals are arranged in a direction from the first lateral surface to the second lateral surface.

5. The connecter according to claim 2, wherein the plurality of detection terminals are arranged in a direction from the first lateral surface to the second lateral surface.

6. The connecter according to claim 3, wherein the plurality of detection terminals are arranged in a direction from the first lateral surface to the second lateral surface.

7. The connector according to claim 1, wherein a width of the fitting portion formed on the first lateral surface and a width of the fitting portion formed on the second lateral surface are substantially equal to or slightly thinner than a pitch of the arrangement of the single cell.

* * * * *

UNITED STATES PATENT AND TRADEMARK OFFICE
CERTIFICATE OF CORRECTION

PATENT NO. : 7,479,046 B2  Page 1 of 1
APPLICATION NO. : 11/657577
DATED : January 20, 2009
INVENTOR(S) : Norishige Konno et al.

It is certified that error appears in the above-identified patent and that said Letters Patent is hereby corrected as shown below:

| Column | Line | |
|---|---|---|
| 2 | 24 | Change "comprises" to --comprising--. |
| 2 | 60 | Before "perspective" insert --a--. |
| 3 | 13 | Before "bottom" insert --a--. |
| 4 | 1 | Change "rectangle" to --rectangular--. |
| 6 | 18 | Change "engaged" to --engagement--. |
| 6 | 38 | Before "second" delete "first". |
| 7 | 9 | Delete "and" (first occurrence). |

Signed and Sealed this

Fourth Day of August, 2009

JOHN DOLL
*Acting Director of the United States Patent and Trademark Office*